(12) United States Patent
Horimoto (10) Patent No.: US 6,956,801 B2
(45) Date of Patent: Oct. 18, 2005

(54) OPTICAL DISC DRIVE AND OPTICAL DISC DISCRIMINATING METHOD

(75) Inventor: Nobuo Horimoto, Ehime (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 10/500,470

(22) PCT Filed: Dec. 27, 2002

(86) PCT No.: PCT/JP02/13814

§ 371 (c)(1),
(2), (4) Date: Jul. 15, 2004

(87) PCT Pub. No.: WO03/063149

PCT Pub. Date: Jul. 31, 2003

(65) Prior Publication Data

US 2005/0152252 A1 Jul. 14, 2005

(30) Foreign Application Priority Data

Jan. 21, 2002 (JP) .............................. 2002-011487

(51) Int. Cl.$^7$ ................................................ G11B 7/00
(52) U.S. Cl. .................................. 369/53.2; 369/44.26
(58) Field of Search ..................... 369/44.25, 44.26, 369/53.2, 53.27

(56) References Cited

U.S. PATENT DOCUMENTS 5,748,597 A * 5/1998 Kim ............................ 369/94

FOREIGN PATENT DOCUMENTS

JP     2000-11528     1/2000
JP     2002-245639     8/2002

\* cited by examiner

*Primary Examiner*—Nabil Hindi
(74) *Attorney, Agent, or Firm*—Armstrong, Kratz, Quintos, Hanson & Brooks, LLP

(57) ABSTRACT

In an optical disc drive capable of recording and playing back different kinds of optical discs, an actuator driving means brings an objective lens close to the optical disc, focus error signals are generated in front of and behind a position where leaser beam comes into focus on a signal surface of the optical disc, optical disc discriminating means discriminates a thickness of the optical disc from a difference in waveform of the focus error signal which is generated by focus deviation between leaser beam which passes through an outer periphery of the objective lens and leaser beam which passes through an inner periphery of the objective lens, and discriminates a kind of the optical disc from the thickness of the optical disc.

9 Claims, 7 Drawing Sheets

OPTICAL DISC DRIVE AND OPTICAL DISC DISCRIMINATING METHOD

TECHNICAL FIELD

The present invention relates to an optical disc drive capable of recording and playing back different kinds of optical discs, and a discriminating method of optical disc for discriminating kinds of optical discs.

BACKGROUND TECHNIQUE

There is a conventionally known discriminating method of kinds of optical discs based a difference in base material thicknesses of optical discs.

Figure 7:
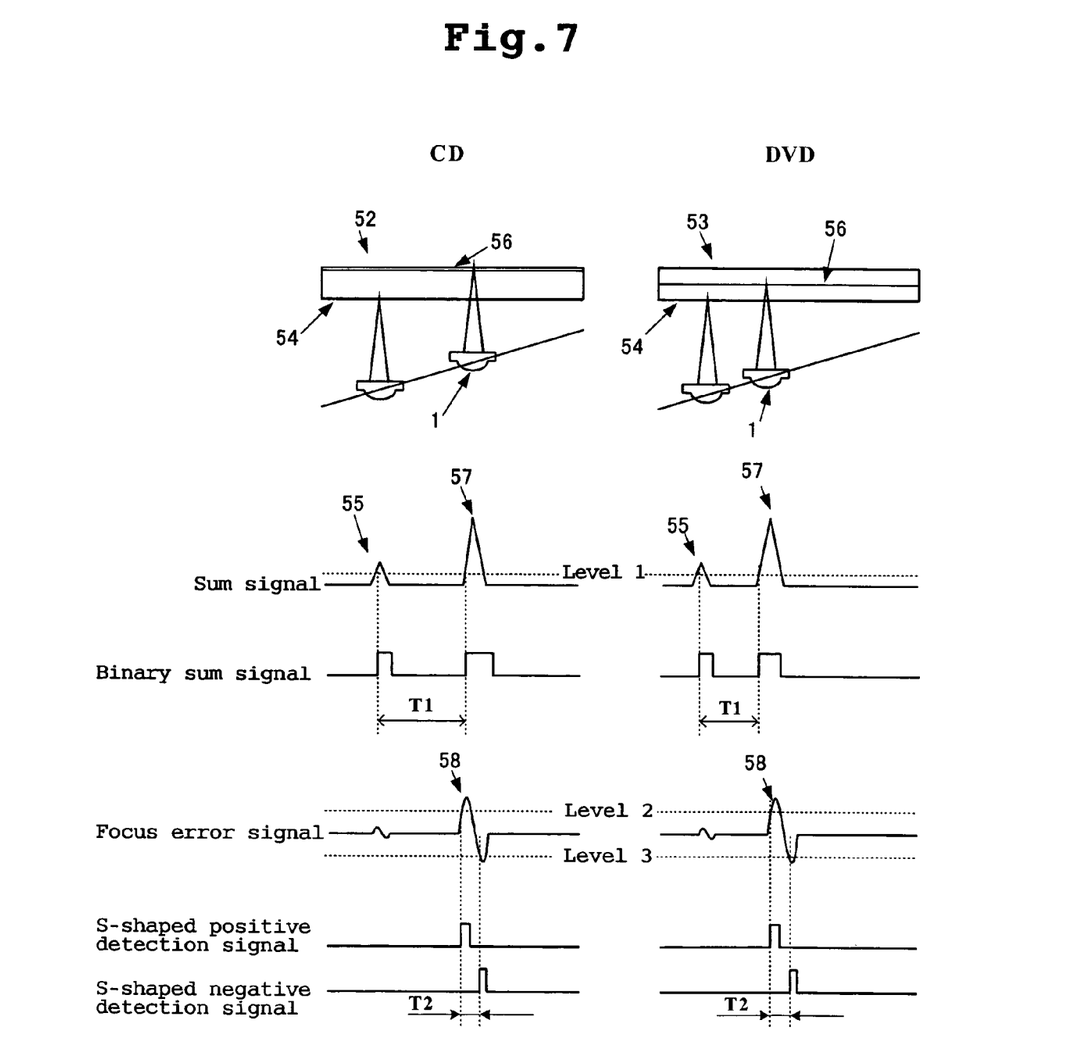
FIG. 7 is a diagram for explaining a conventional discriminating method of optical discs.
Figure 8:
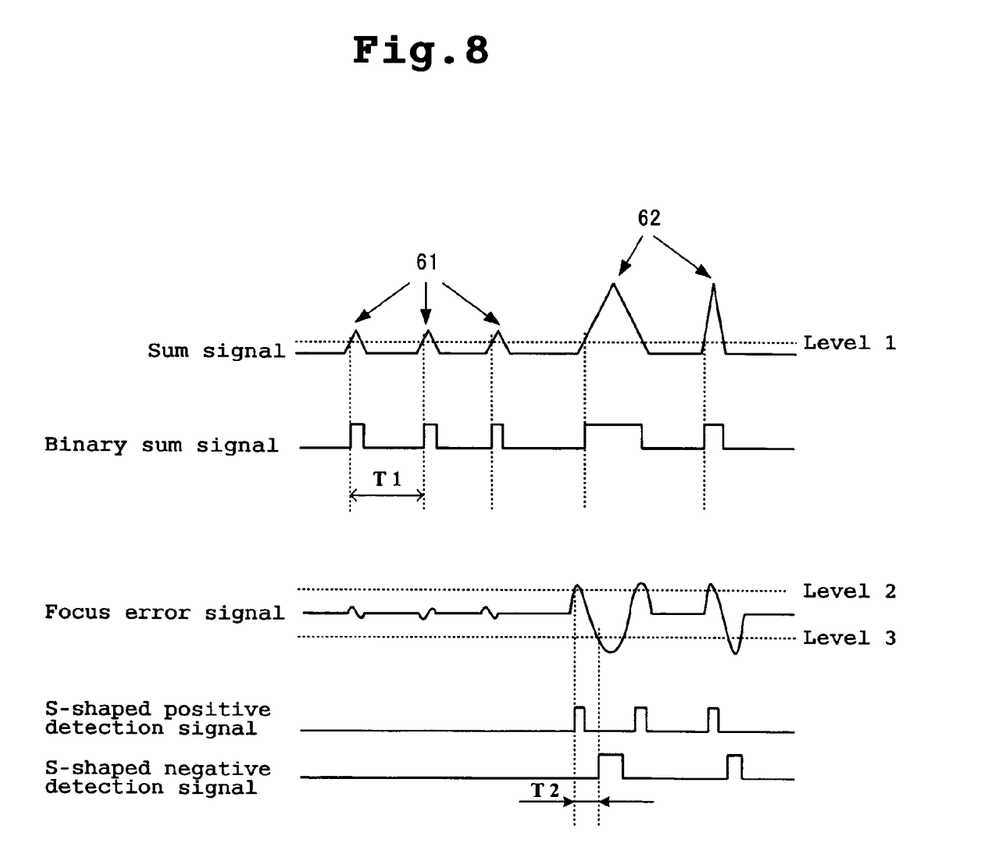
FIG. 8 is a diagram for explaining a signal state when a surface of an optical disc is deflected.

FIG. 7 shows such a conventional discriminating method of optical discs.

First, a discriminating method of optical discs disclosed in Japanese Patent Application Laid-open No.H8-287588 will be explained.

In this conventional technique, if an objective lens 1 shown in FIG. 7 is brought close to a CD 52 or a DVD 53, a sum signal 55 having a small amplitude based on light reflected from the disc is obtained at a position where laser beam comes into focus on a base material surface 54. Then, if the objective lens 1 is brought further close to the CD 52 or the DVD 53, another sum signal 57 having a large amplitude based on light reflected from the disc is obtained at a position where laser beam comes into focus on a signal surface 56. These sum signals 55 and 57 are compared with level 1, and differential time T1 between the instant when the base material surface 54 was detected and the instant when the signal surface 56 is detected is measured based on a binary type sum signal. The base material thickness of the optical disc is recognized depending upon the length of the measured differential time T1, and a kind of the optical disc is discriminated based on the recognized base material thickness.

Next, a discriminating method of optical discs disclosed in Japanese Patent Application Laid-open No.H11-149640 will be explained.

In this conventional technique, the following method is proposed so as to enhance the discriminating precision of discs.

That is, an S-shaped signal portion 58 in a focus error signal generated based on light reflected from the optical disc is compared with level 2 and level 3, thereby generating an S-shaped positive detection signal and an S-shaped negative detection signal, and detection differential time T2 between an S-shaped positive signal and an S-shaped negative signal is measured. The differential time T1 between the instant when the base material surface 54 was detected and the instant when the signal surface 56 is measured. Then, T1/T2 is calculated, thereby normalizing differential time between the instant when the base material surface 54 was detected and the instant when the signal surface 56 is detected. This conventional technique uses the normalized T1/T2 value, thereby eliminating influence of sensitive variation in a focus direction of an actuator.

When a surface of the optical disc is deflected, however, since the base material surface and the signal surface are vertically deflected, sum signals 61 based on light reflected from the base material surface and sum signals 62 based on light reflected from the signal surface are generated at a plurality of locations, and positions are varied in the longitudinal direction. For this reason, this conventional technique has a problem that the time can not be measured precisely and discrimination error of discs is generated. Further, there are problems that the sum signal 61 of the base material surface has a small amplitude, noise is erroneously detected as the sum signal 61 of the base material surface, time can not be measured precisely and discrimination error of discs is generated.

According to a discriminating method of optical discs disclosed in Japanese Patent Application Laid-open No.H11-149640, two signals, i.e., a focus error signal and a sum signal are required, time measuring means of T1, binary means of the focus error signal and binary means of the sum signal are required, and the structure becomes complicated.

Thereupon, it is an object of the present invention to precisely discriminate kinds of discs even when a focus position is varied by deflection of surface and a plurality of S-shapes of the focus error signal are generated.

It is another object of the invention to eliminate influence of variation in laser power and reflection ratio of optical discs, and to discriminate discs precisely.

DISCLOSURE OF THE INVENTION

A first aspect of the present invention provides an optical disc drive capable of recording and playing back different kinds of optical discs, comprising a pickup for irradiating the optical disc with leaser beam, laser control means for controlling the irradiation of the leaser beam, actuator driving means for moving an objective lens which constitutes the pickup in a focus direction, focus detection photoreceiving means for detecting a focus state by means of light reflected from the optical disc, FE signal measuring means for measuring an amplitude of a focus error signal which is generated by the focus detection photoreceiving means, and optical disc discriminating means for discriminating the optical disc from the amplitude measured by the FE signal measuring means, wherein the actuator driving means brings the objective lens close to the optical disc, focus error signals are generated in front of and behind a position where the leaser beam comes into focus on a signal surface of the optical disc, the optical disc discriminating means discriminates a thickness of the optical disc from a difference in waveform of the focus error signal which is generated by focus deviation between leaser beam which passes through an outer periphery of the objective lens and leaser beam which passes through an inner periphery of the objective lens, and discriminates a kind of the optical disc from the thickness of the optical disc.

According to the first aspect, the thickness of the optical disc is discriminated from the difference in waveform of the focus error signal which is generated by focus deviation between leaser beam which passes through an outer periphery of the objective lens and leaser beam which passes through an inner periphery of the objective lens. Therefore, even if the focus position is varied due to the surface deflection and a plurality of S-shapes of the focus error signals are generated, the waveform of the focus error signal is not varied only if the thickness of the optical disc is the same. Further, if the thicknesses of the optical discs are different, the waveform of the focus error signal is different and thus, it is possible to discriminate a kind of the disc precisely. Since it is unnecessary to measure the time, the time counting means is not required. It is also unnecessary to detect a sum signal having small amplitude of the base material surface, a case in which noise is erroneously detected and an optical disc is erroneously discriminated is not caused, and it is possible to precisely discriminate the optical disc.

According to a second aspect of the present invention, in the optical disc of the first aspect, when a maximum value of the amplitude of the focus error signal is defined as FEmax and a minimum value of the amplitude of the focus error signal is defined as FEmin, an absolute value of the FEmax and an absolute value of the FEmin are compared with each other, thereby discriminating the thickness of the optical disc.

With this aspect, even if the focus position is varied due to the surface deflection and the plurality of S-shapes of the focus error signals are generated, since the magnitude of each of the maximum value and minimum value of the amplitude is not varied, it is possible to discriminate a kind of a disc precisely by comparing the absolute value of FEmax and absolute value of FEmin with each other.

According to a third aspect of the present invention, in the optical disc of the first aspect, when a maximum value of the amplitude of the focus error signal is defined as FEmax and a minimum value of the amplitude of the focus error signal is defined as FEmin, the thickness of the optical disc is discriminated by means of a value (FEmax+FEmin)/(FEmax−FEmin).

With this aspect, a ratio between a sum and a difference of the maximum value FEmax and the minimum value FEmin of the focus error signal is obtained and normalized, thereby eliminating the influence of the variation of laser power and the variation of the reflection ratio of the optical disc, and it is possible to precisely discriminate the disc.

According to a fourth aspect of the present invention, in the optical disc of the first aspect, when a maximum value of the amplitude of the focus error signal is defined as FEmax and a minimum value of the amplitude of the focus error signal is defined as FEmin, a difference between an absolute value of the FEmax and an absolute value of the FEmin is obtained, and this difference is compared with a predetermined discrimination value, thereby discriminating the thickness of the optical disc.

With this aspect, even if the focus position is varied due to the surface deflection and the plurality of S-shapes of the focus error signals are generated, since the magnitude of each of the maximum value and minimum value of the amplitude is not varied, it is possible to discriminate a kind of a disc precisely by comparing the difference between the absolute value of FEmax and absolute value of FEmin with the predetermined discrimination value.

A fifth aspect of the present invention provides an optical disc drive capable of recording and playing back different kinds of optical discs, comprising a pickup for irradiating the optical disc with leaser beam, laser control means for controlling the irradiation of the leaser beam, actuator driving means for moving an objective lens which constitutes the pickup in a focus direction, focus detection photoreceiving means for detecting a focus state by means of light reflected from the optical disc, FE signal measuring means for measuring an amplitude of a focus error signal which is generated by the focus detection photoreceiving means, and optical disc discriminating means for discriminating the optical disc from the amplitude measured by the FE signal measuring means, wherein the actuator driving means brings the objective lens close to the optical disc, focus error signals are generated in front of and behind a position where the leaser beam comes into focus on a signal surface of the optical disc, the optical disc discriminating means discriminates a thickness of the optical disc from a symmetry between a positive waveform and a negative waveform of an amplitude of the focus error signal which is generated by focus deviation between leaser beam which passes through an outer periphery of the objective lens and leaser beam which passes through an inner periphery of the objective lens, and discriminates a kind of the optical disc from the thickness of the optical disc.

According to the fifth aspect, the thickness of the optical disc is discriminated from a symmetry between a positive waveform and a negative waveform of an amplitude of the focus error signal which is generated by focus deviation between leaser beam which passes through an outer periphery of the objective lens and leaser beam which passes through an inner periphery of the objective lens. Therefore, even if the focus position is varied due to the surface deflection and a plurality of S-shapes of the focus error signals are generated, the waveform of the focus error signal is not varied only if the thickness of the optical disc is the same. Further, if the thicknesses of the optical discs are different, the waveform of the focus error signal is different and thus, it is possible to discriminate a kind of the disc precisely. Since it is unnecessary to measure the time, the time counting means is not required. It is also unnecessary to detect a sum signal having small amplitude of the base material surface, a case in which noise is erroneously detected and an optical disc is erroneously discriminated is not caused, and it is possible to precisely discriminate the optical disc.

A sixth aspect of the present invention provides an optical disc discriminating method for discriminating a kind of an optical disc, comprising a driving step for bringing an objective lens close to the optical disc while irradiating the optical disc with leaser beam, an FE signal measuring step for measuring an amplitude of a focus error signal during the driving step and for storing a maximum value FEmax and a minimum value FEmin of the focus error signal, and a discriminating step for comparing a difference between an absolute value of the maximum value FEmax and an absolute value of the minimum value FEmin which are stored in the FE signal measuring step with a previously stored discrimination value, wherein the kind of the optical disc is discriminated in the discriminating step.

With this aspect, even if the focus position is varied due to the surface deflection and a plurality of S-shapes of the focus error signals are generated, since the magnitude of each of the maximum value and minimum value of the amplitude is not varied, it is possible to discriminate a kind of a disc precisely. Since it is unnecessary to measure the time, the time counting means is not required. It is also unnecessary to detect a sum signal having small amplitude of the base material surface, a case in which noise is erroneously detected and an optical disc is erroneously discriminated is not caused, and it is possible to precisely discriminate the optical disc.

According to a seventh aspect of the present invention, in the optical disc discriminating method of the sixth aspect, in the discriminating step, (FEmax+FEmin)/(FEmax−FEmin) is calculated, the calculated (FEmax+FEmin)/(FEmax−FEmin) is compared with the previously stored discrimination value, thereby discriminating the kind of the optical disc.

With this aspect, a ratio between a sum and a difference of the maximum value FEmax and the minimum value FEmin of the focus error signal is obtained and normalized, thereby eliminating the influence of the variation of laser power and the variation of the reflection ratio of the optical disc, and it is possible to precisely discriminate the disc.

According to an eighth aspect of the present invention, in the optical disc discriminating method of the sixth or seventh aspect, a value obtained by calculating the maximum value FEmax and the minimum value FEmin based on the focus error signal at a position where the leaser beam comes into focus is used as the discrimination value.

With this aspect, since the focus error signal at the position where the leaser beam comes into focus is used as a reference, it is possible to discriminate a kind of the disc more precisely.

According to a ninth aspect of the present invention, in the optical disc drive of any one of the first to fifth aspects, the optical disc drive uses a pickup in which a focus deviation is generated between leaser beam which passes through an outer periphery of the objective lens and leaser beam which passes through an inner periphery of the objective lens by a difference in base material thickness of optical disc.

With this aspect, since the optical disc drive uses a pickup in which a focus deviation is generated between leaser beam which passes through an outer periphery of the objective lens and leaser beam which passes through an inner periphery of the objective lens by a difference in base material thickness of optical disc, the amplitudes of the maximum value FEmax and the minimum value FEmin can be made different from each other, and it is possible to discriminate a kind of the disc more precisely.

BEST MODE FOR CARRYING OUT THE INVENTION

Figure 2:
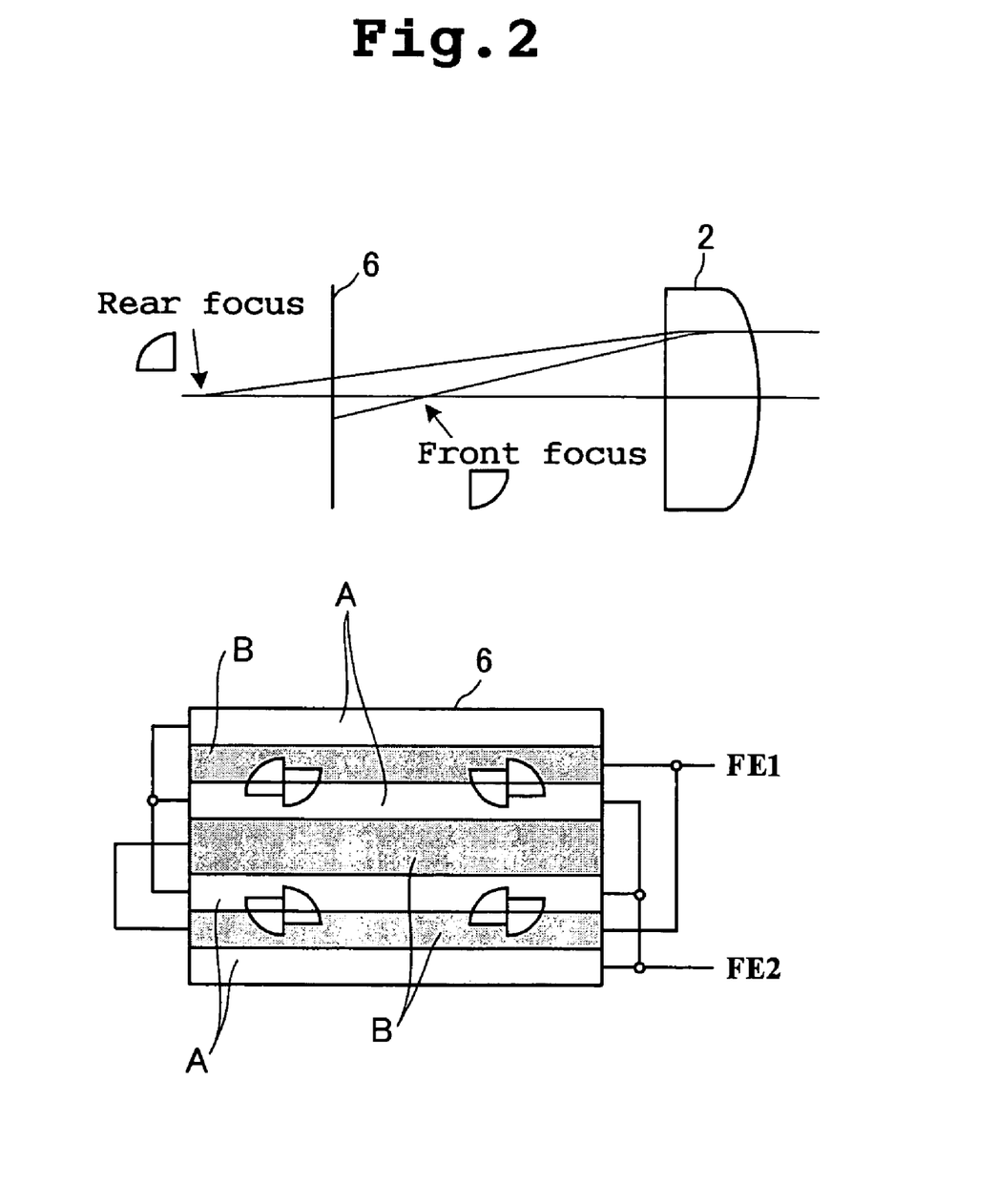
FIG. 2 is a diagram for explaining a generating method of an FE signal according to the embodiment.
Figure 3:
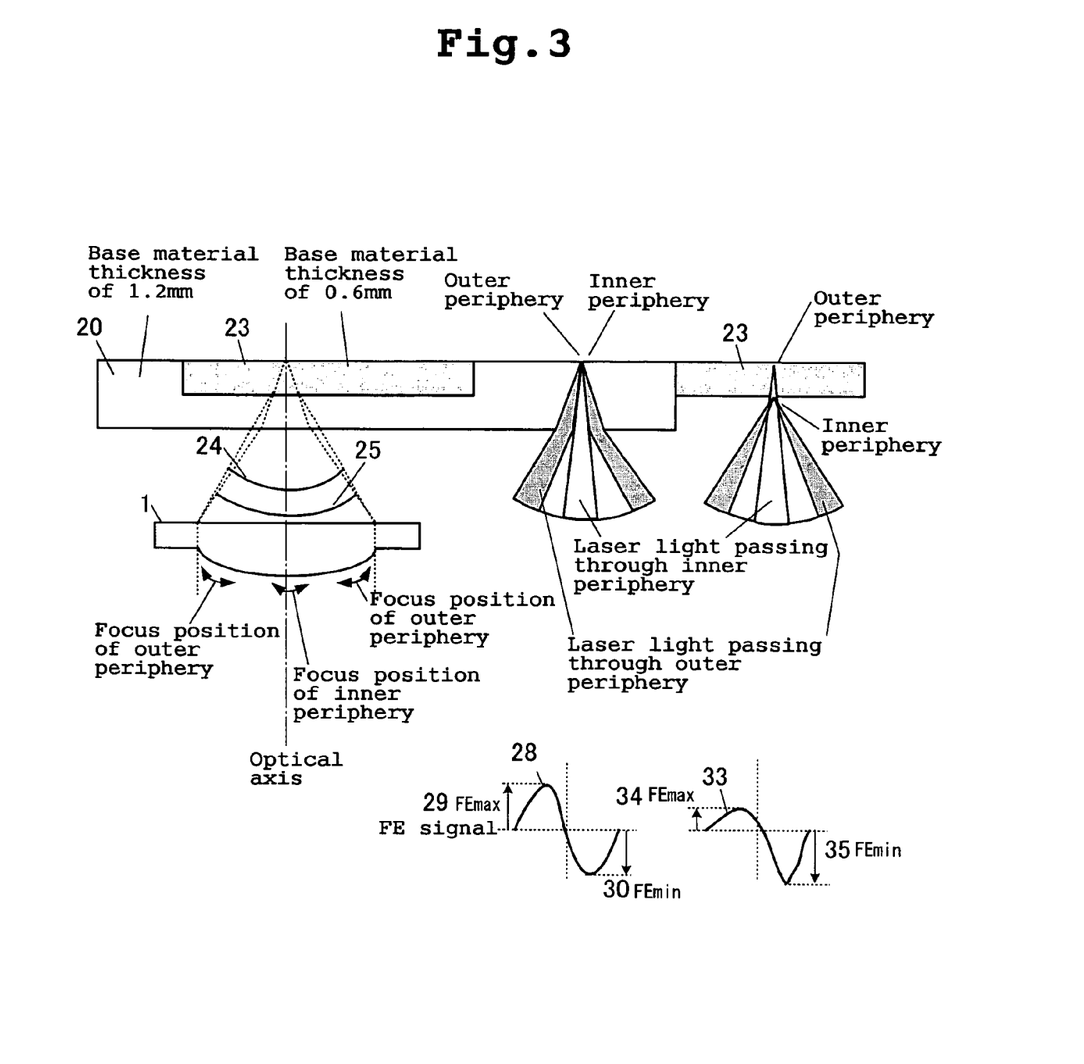
FIG. 3 is a diagram for explaining influence of a difference in base material thickness of an optical disc exerted on the FE signal.

An optical disc drive according to an embodiment of the present invention will be explained using FIGS. 1 to 3.

Figure 1:
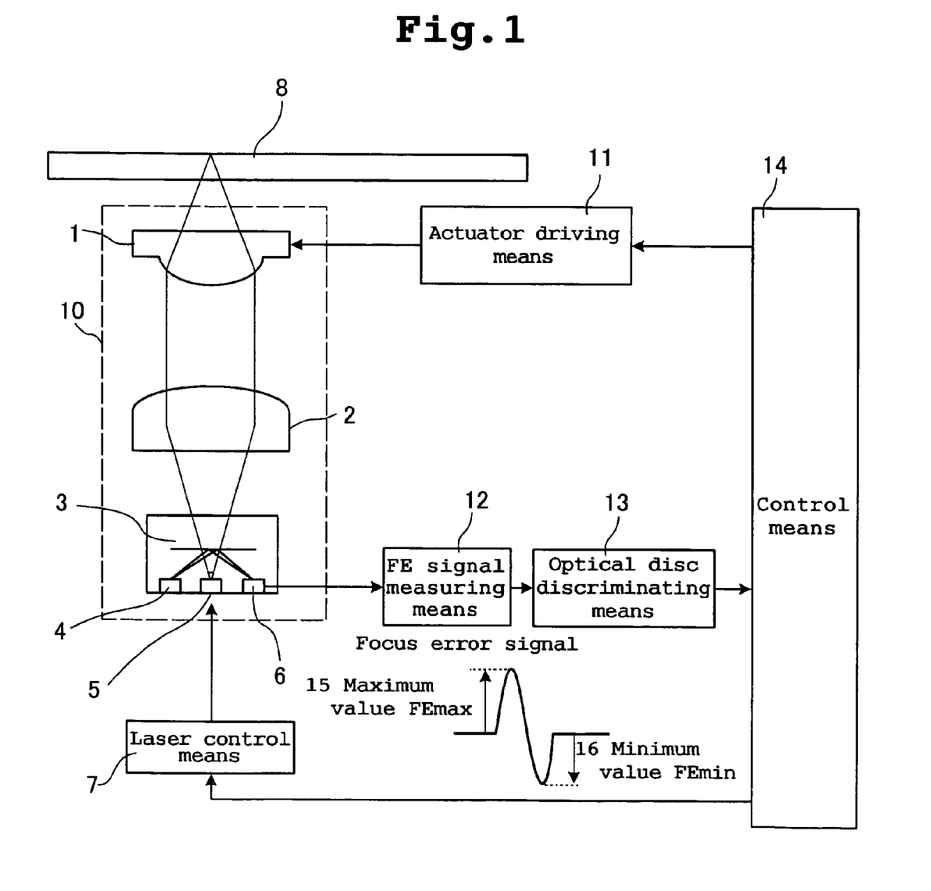
FIG. 1 is a block diagram of an optical disc drive according to an embodiment of the present invention.

FIG. 1 is a block diagram of the optical disc drive according to the embodiment. A pickup 10 can obtain a playback signal from different kinds of optical discs such as CDs and DVDs and write a recording signal into different kinds of optical discs such as CDs and DVDs. The pickup 10 includes a semiconductor laser 5, a condensing lens 2, an objective lens 1, a polarizing hologram 3, a tracking detection photoreceiving means 4 and a focus detection photoreceiving means 6. The semiconductor laser 5 emits laser having appropriate power under control of laser control means 7. In order to resolve a focus error and a tracking error, the objective lens 1 can respectively move in a focus direction and a diameter direction of the disc in response to a driving signal from an actuator driving means 11.

The condensing lens 2 converts laser beam irradiated from the semiconductor laser 5 into parallel light. When DVD laser beam is converted into parallel light, the CD laser beam is slightly diffused. Light which passed through the condensing lens 2 forms a light spot on the optical disc 8 by the objective lens 1. On the other hand, light reflected from the optical disc 8 passes through the objective lens 1 and the condensing lens 2, and is diffracted into focus detecting reflection light and tracking detecting reflection light by means of the polarizing hologram 3, and the focus detecting reflection light collides against the focus detection photoreceiving means 6. The FE signal measuring means 12 measures a maximum value FEmax 15 and a minimum value FEmin 16 of the focus error signal which was outputted from the focus detection photoreceiving means 6 as a voltage value or a current value. The optical disc discriminating means 13 can discriminate a kind of the optical disc from a difference in waveform of the S-shaped signal based on the focus error signal at a position where the laser beam comes into focus. Here, the optical disc discriminating means 13 discriminates the kind of the optical disc based on the maximum value FEmax and the minimum value FEmin of the amplitude of the focus error signal measured by the FE signal measuring means 12. Here, the focus error signal at a position where the laser beam comes into focus is defined as 0 (reference), and values of the maximum value FEmax and the minimum value FEmin are calculated. Control means 14 controls the actuator driving means 11, the optical disc discriminating means 13 and the laser control means 7.

Next, one method for generating the FE signal will be explained with reference to FIG. 2.

The focus detecting reflection light diffracted by the condensing lens 2 is divided into four, and each divided light is further divided into light brought into focus in front of the focus detection photoreceiving means 6 and light brought into focus behind the focus detection photoreceiving means 6, and each light collides against the focus detection photoreceiving means 6. Regions A and B are formed on a surface of the focus detection photoreceiving means 6 by a parting line. Voltage with respect to light quantity colliding against the region B by a photoelectric effect is outputted as FE1, and voltage with respect to light quantity colliding against the region A by a photoelectric effect is outputted as FE2. The focus error signal is generated by a difference between the two voltages FE1–FE2.

Next, influence of a difference in base material thickness of an optical disc exerted on the FE signal will be explained with reference to FIG. 3.

Deviation is generated in laser beam condensed by the objective lens 1 at a focus position where the laser beam passes through an outer periphery of the objective lens 1 located far from an optical axis and is condensed and a focus position where the laser beam passes through an inner periphery of the objective lens 1 located in the vicinity of the optical axis and is condensed. This is called spherical aberration.

Unlike a wave front 24 in the air when light is converged through a DVD 23 having a base material thickness of 0.6 mm without spherical aberration, in the case of a wave front 25 in the air when light is converged through a CD 20 having a base material thickness of 1.2 mm without spherical aberration, the focus position is delayed on that portion of the wave front 25 which is closer to its outer periphery and which is further from the optical axis.

In order to make it possible to playback and record two or more kinds of optical discs, the pickup 10 of the optical disc drive according to this embodiment can irradiate two or more kinds of laser beams having different wavelengths. The pickup 10 may be a single pickup capable of handling the two or more kinds of optical discs by switching an optical system or a signal outputting system, but the pickup 10 may comprise a plurality of pickups. Here, first laser beam irradiated from the pickup 10 is called DVD playback laser beam, and second leaser beam irradiated from the pickup 10 is called CD playback leaser beam.

The first laser beam for DVD playback is designed such that the spherical aberration becomes minimum with respect to the DVD 23, and the second laser beam for CD playback is designed such that the spherical aberration becomes minimum with respect to the CD 20.

When using an objective lens 1 which is designed such that the spherical aberration of the first laser beam becomes minimum in the focus position of the DVD 23, the light is slightly diverged by the condensing lens 2 such that the focus position of leaser beam passing through the outer periphery is delayed with respect to the second laser beam which plays back the CD 20. Here, since the wave front at the outer periphery is delayed if the DVD 23 is irradiated with second laser beam, light passing through the outer periphery comes into focus in front of the focus position of light passing through the inner periphery.

Here, when the objective lens 1 is brought close to the CD 20 while irradiating second laser beam, no delay is generated in leaser beam passing through the inner periphery and leaser beam passing through the outer periphery. Therefore, FEmax 29 and FEmin 30 of an FE signal 28 formed of light which passed through the entire surface of the objective lens 1 become amplitude signals having substantially the same size. On the other hand, when the objective lens 1 is brought closer to the DVD 23, leaser beam passing through the outer periphery is delayed from leaser beam passing through the inner periphery. Therefore, FE signal 33 formed of light which passed through the entire surface of the objective lens 1 becomes a signal in which the value FEmax 34 is small and the value FEmin 35 is large. Therefore, if absolute values |FEmax| and |FEmin| are compared with each other, it is possible to discriminate the thickness of the disc.

Figure 4:
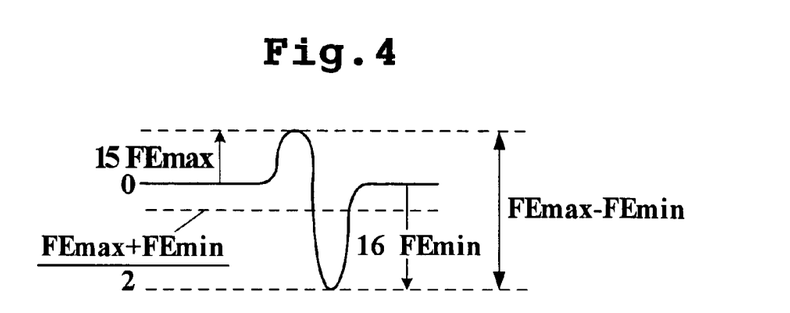
FIG. 4 is a diagram for explaining a normalizing processing in a discriminating method of optical discs according to the embodiment.

Next, normalizing processing in the discriminating method of optical discs according to the embodiment of the invention will be explained using FIG. 4.

The FEmax and FEmin are largely varied by variation in laser power and variation in reflection ratio of optical discs. To eliminate the influence of the variations, the following normalizing processing is carried out in the optical disc discriminating means 13.

An intermediate level (FEmax+FEmin)/2 of a focus error signal is divided by an amplitude value (FEmax−FEmin) of the focus error signal, thereby obtaining a vertical balance value (FEmax+FEmin)/(FEmax−FEmin) of the focus error signal. Since the vertical balance value cancels the amplitude level of the focus error signal, it is possible to reduce the influence of the variation in laser power and variation of the reflection ratio of the optical discs. The vertical balance value (FEmax+FEmin)/(FEmax−FEmin) of the focus error signal is compared with a preset discrimination value, thereby discriminating the optical disc.

Next, the optical disc discriminating method of the embodiment will be explained using FIG. 5. The optical disc discriminating method of this embodiment can be carried out in the optical disc drive shown in FIG. 1.

Figure 5:
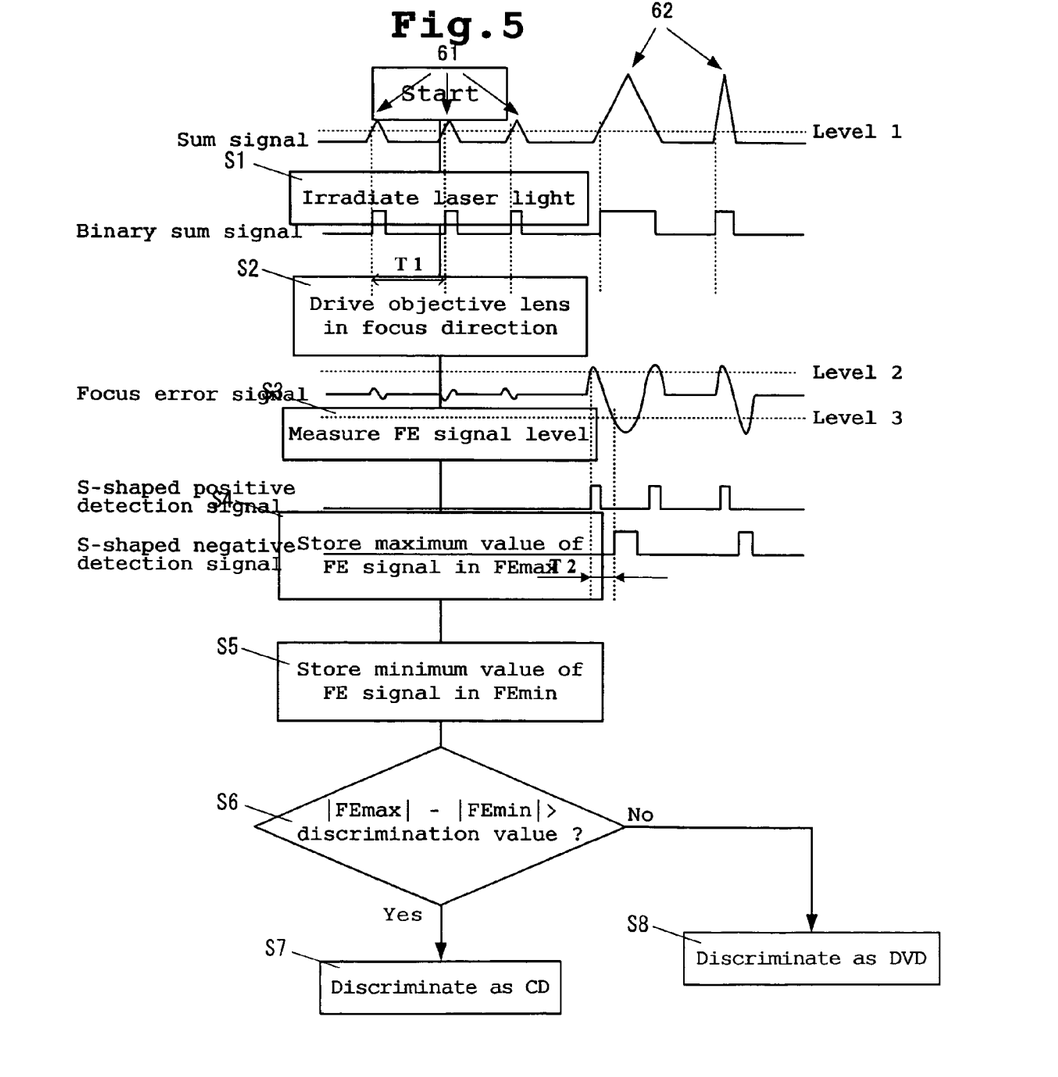
FIG. 5 is a flowchart of the discriminating method of optical discs according to the embodiment.

FIG. 5 is a flowchart of the optical disc discriminating method of this embodiment.

The optical disc 8 is irradiated with leaser beam (S1) and in this state, the objective lens 1 existing in the pickup 10 is driven in a focus direction (S2). While the objective lens 1 is driven, the FE signal is measured (S3), the FE signal maximum value is stored in the FEmax (S4), the FE signal minimum value is stored in the FEmin (S5). Then, a difference between an absolute value of the FEmax and an absolute value of the FEmin are compared with a predetermined discrimination value (S6), and if the difference is greater than the predetermined discrimination value, the disc is discriminated as being a CD (S7), and if the difference is smaller than the discrimination value, the disc is discriminated as being a DVD (S8).

Next, an optical disc discriminating method according to another embodiment of the present invention will be explained using FIG. 6.

Figure 6:
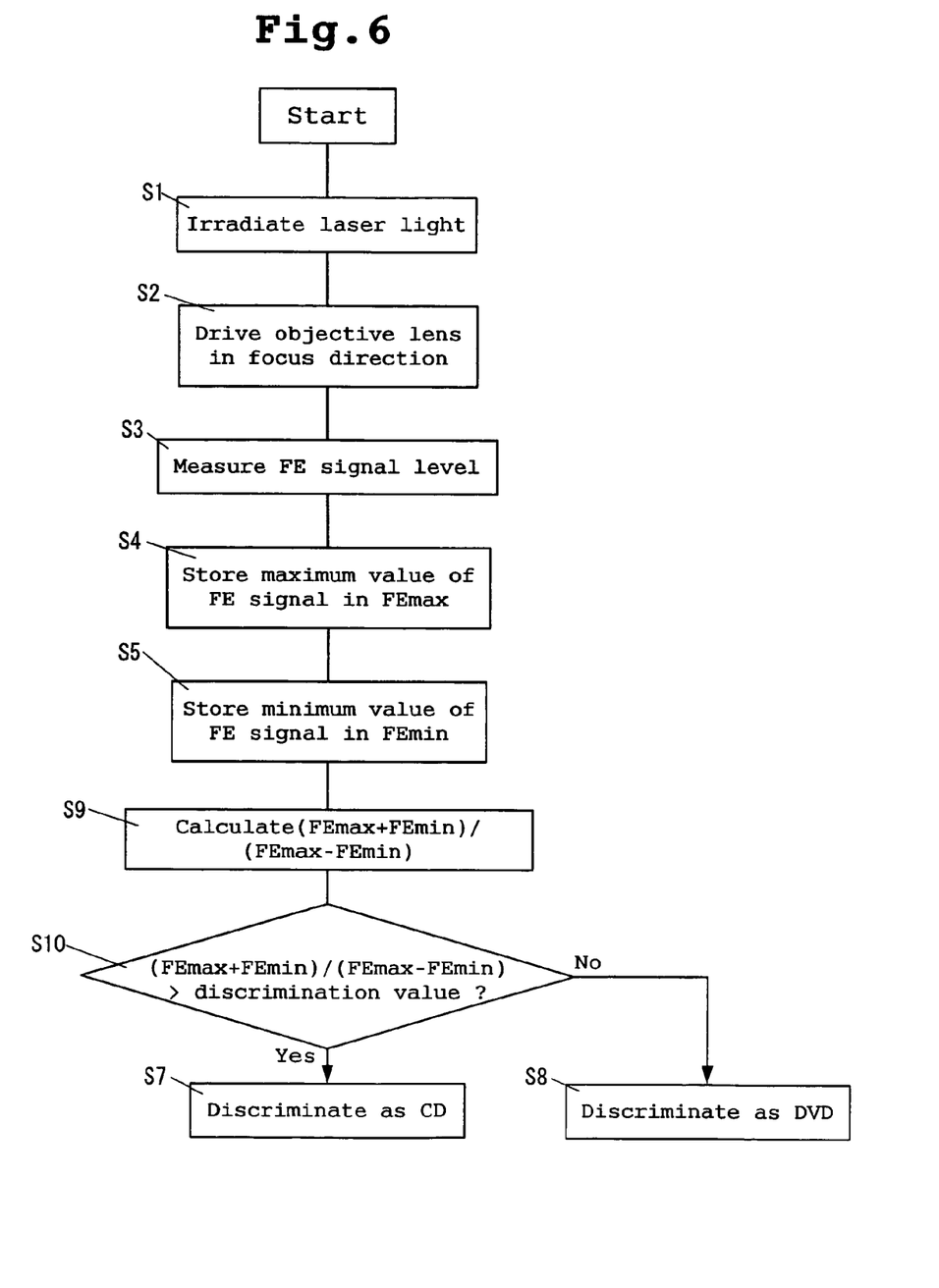
FIG. 6 is a flowchart of the discriminating method of optical discs according to another embodiment.

FIG. 6 is a flowchart of the optical disc discriminating method of this embodiment.

The optical disc 8 is irradiated with leaser beam (S1) and in this state, the objective lens 1 existing in the pickup 10 is driven in a focus direction (S2). While the objective lens 1 is driven, the FE signal is measured (S3), the FE signal maximum value is stored in the FEmax (S4), the FE signal minimum value is stored in the FEmin (S5). Then, (FEmax+FEmin)/(FEmax−FEmin) is calculated (S9), and a result of the calculation is compared with a preset discrimination value (S10). If the result of the calculation is greater than the predetermined discrimination value, the disc is discriminated as being a CD (S7), and if the difference is smaller than the discrimination value, the disc is discriminated as being a DVD (S8).

As the pickup, since a pickup in which a deviation between focus of leaser beam passing through the outer periphery and focus of leaser beam passing through the inner periphery is generated due to a difference in base material thicknesses of optical discs is used, amplitudes of the maximum value FEmax and the minimum value FEmin can be made different from each other, and it is possible to discriminate the kinds of discs more precisely.

Although two kinds of discs having the base material thickness of 0.6 mm and the base material thickness of 1.2 mm are discriminated in the above embodiment, another base material thickness may be employed, and kinds of three or more discs having different base material thicknesses can also be discriminated, and the invention can also be applied to a base material thickness A, a base material thickness B and a base material thickness C (in a relation of A>B>C).

The kinds of optical discs are discriminated based on the maximum value FEmax and the minimum value FEmin of the amplitude of the focus error signal in the above embodiment. Alternatively, it is also possible to employ the following configuration. That is, symmetry between a positive waveform and a negative waveform of an amplitude of a focus error signal is obtained as a difference in waveforms of a S-shaped signal, then, a degree of the symmetry between the positive waveform and the negative waveform may be compared with a preset reference value. Further, as another means for discriminating a difference in waveforms of the S-shaped signal, an amplitude ration of the focus error signal is obtained, then, this amplitude ration may be compared with a preset reference value. Further, as another means for discriminating a difference in waveforms of the S-shaped signal, a ratio of an intermediate value between a maximum value and a minimum value of the focus error signal and an amplitude of the focus error signal is obtained, then, this ratio may be compared with a preset reference value.

INDUSTRIAL APPLICABILITY

According to the present invention, as described above, it is possible to discriminate kinds of discs precisely without being affected by surface deflection, noise, variation in laser power output and the like, and without the need of time-counting means.

What is claimed is:

1. An optical disc drive capable of recording and playing back different kinds of optical discs, comprising a pickup for irradiating the optical disc with leaser beam, laser control means for controlling the irradiation of the leaser beam, actuator driving means for moving an objective lens which constitutes said pickup in a focus direction, focus detection photoreceiving means for detecting a focus state by means of light reflected from said optical disc, FE signal measuring means for measuring an amplitude of a focus error signal which is generated by said focus detection photoreceiving means, and optical disc discriminating means for discriminating said optical disc from the amplitude measured by said FE signal measuring means, wherein said actuator driving means brings said objective lens close to the optical disc, focus error signals are generated in front of and behind a position where the leaser beam comes into focus on a signal surface of the optical disc, said optical disc discriminating means discriminates a thickness of the optical disc from a difference in waveform of the focus error signal which is generated by focus deviation between leaser beam which passes through an outer periphery of said objective lens and leaser beam which passes through an inner periphery of said objective lens, and discriminates a kind of said optical disc from the thickness of said optical disc.

2. The optical disc drive according to claim 1, wherein when a maximum value of the amplitude of said focus error signal is defined as FEmax and a minimum value of the amplitude of said focus error signal is defined as FEmin, an absolute value of the FEmax and an absolute value of the FEmin are compared with each other, thereby discriminating the thickness of the optical disc.

3. The optical disc drive according to claim 1, wherein when a maximum value of the amplitude of said focus error signal is defined as FEmax and a minimum value of the amplitude of said focus error signal is defined as FEmin, the thickness of said optical disc is discriminated by means of a value (FEmax+FEmin)/(FEmax−FEmin).

4. The optical disc drive according to claim 1, wherein when a maximum value of the amplitude of said focus error signal is defined as FEmax and a minimum value of the amplitude of said focus error signal is defined as FEmin, a difference between an absolute value of the FEmax and an absolute value of the FEmin is obtained, and this difference is compared with a predetermined discrimination value, thereby discriminating the thickness of said optical disc.

5. An optical disc drive capable of recording and playing back different kinds of optical discs, comprising a pickup for irradiating the optical disc with leaser beam, laser control means for controlling the irradiation of the leaser beam, actuator driving means for moving an objective lens which constitutes said pickup in a focus direction, focus detection photoreceiving means for detecting a focus state by means of light reflected from said optical disc, FE signal measuring means for measuring an amplitude of a focus error signal which is generated by said focus detection photoreceiving means, and optical disc discriminating means for discriminating said optical disc from the amplitude measured by said FE signal measuring means, wherein said actuator driving means brings said objective lens close to the optical disc, focus error signals are generated in front of and behind a position where the leaser beam comes into focus on a signal surface of the optical disc, said optical disc discriminating means discriminates a thickness of the optical disc from a symmetry between a positive waveform and a negative waveform of an amplitude of the focus error signal which is generated by focus deviation between leaser beam which passes through an outer periphery of said objective lens and leaser beam which passes through an inner periphery of said objective lens, and discriminates a kind of said optical disc from the thickness of said optical disc.

6. An optical disc discriminating method for discriminating a kind of an optical disc, comprising a driving step for bringing an objective lens close to the optical disc while irradiating the optical disc with leaser beam, an FE signal measuring step for measuring an amplitude of a focus error signal during said driving step and for storing a maximum value FEmax and a minimum value FEmin of said focus error signal, and a discriminating step for comparing a difference between an absolute value of the maximum value FEmax and an absolute value of the minimum value FEmin which are stored in said FE signal measuring step with a previously stored discrimination value, wherein the kind of the optical disc is discriminated in said discriminating step.

7. The optical disc discriminating method according to claim 6, wherein in said discriminating step, (FEmax+FEmin)/(FEmax−FEmin) is calculated, said calculated (FEmax+FEmin)/(FEmax−FEmin) is compared with the previously stored discrimination value, thereby discriminating the kind of the optical disc.

8. The optical disc discriminating method according to claim 6 or claim 7, wherein a value obtained by calculating the maximum value FEmax and the minimum value FEmin based on the focus error signal at a position where said leaser beam comes into focus is used as said discrimination value.

9. The optical disc drive according to any one of claims 1 to 5, wherein the optical disc drive uses a pickup in which a focus deviation is generated between leaser beam which passes through an outer periphery of said objective lens and leaser beam which passes through an inner periphery of said objective lens by a difference in base material thickness of optical disc.

* * * * *